Oct. 23, 1951  E. REDIN ET AL  2,572,518
TEST-MILKING APPARATUS
Filed April 9, 1948
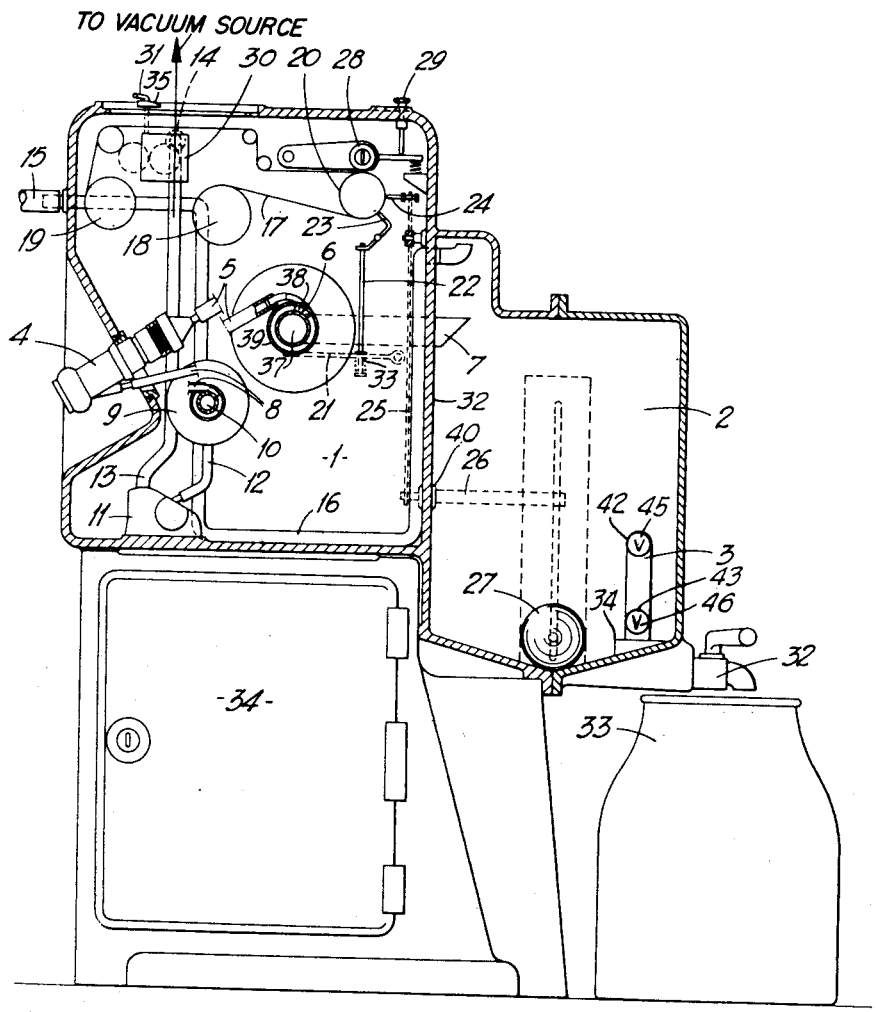
Inventors
Eric Redin,
Helge Ryde
by Sommers & Young
Attorneys Patented Oct. 23, 1951

2,572,518

UNITED STATES PATENT OFFICE 2,572,518

TEST-MILKING APPARATUS

Eric Redin, Norrkoping, and Helge Ryde, Smedslatten, Sweden

Application April 9, 1948, Serial No. 20,143
In Sweden April 26, 1947

6 Claims. (Cl. 119—14.14)

The present invention has for its object to provide a mechanizing of the test-milking of herds of animals. Hitherto, as a rule, the test-milking of a herd of animals has been performed under the supervision of a controller who notes the quantity of milk obtained from the individual animals and by means of a galactoscope finds out the percentage of fat contained in the milk from every individual animal.

According to the invention the test-milking operation is accomplished by means of a milking machine having means for taking test samples from each individual animal and means for automatically sealing the tubes or glasses containing the milk test samples while positively rendering any scamping impossible. The taking of the samples may thus be entrusted to the respective owner without supervision by a controller. The automatically filled and sealed test glasses or tubes, which may be so constructed and arranged as also to state the quantity of milk as obtained from the respective animal, are sent to a controlling authority where the milk obtained from a district, within which one or more test-milking apparatuses may be in circulation, is analyzed.

As a result of this organization the controlling staff hitherto required within a limited district may serve a considerably larger district without neglecting the exactness of the control.

The principle of the invention and the practical performance thereof will more nearly appear from the following description with reference to the accompanying drawing in which a test-milking apparatus according to the invention is shown in a substantially diagrammatic way. The drawing is, in part, a side elevation and, in part, a vertical section of said apparatus.

The apparatus illustrated in the drawing is enclosed within a casing containing two separate chambers 1 and 2. The casing containing said two chambers rests on a frame which may contain a storage space closed by a door, as shown at 34.

The chamber 1 contains parts 4 to 16 of a milking machine and parts 17 to 25 and 28 to 30 of a registering mechanism, while chamber 2 forms a milk collecting chamber in which a test tube or glass 3 is held in a holding means 34. Provided in chamber 1 are four teat cups 4, though but one thereof is visible in the drawing, because all of the teat cups are assumed in the example shown to be situated beside each other in an indented portion of the wall of chamber 1 so that the three remaining teat cups are concealed by that shown in the drawing. A flexible milk tube 5 leads from each individual teat cup to a drum for receiving the tubes and an associated milk collecting pipe 6, the arrangement being such as to allow the teat cups to be withdrawn sufficiently for placing them on the teats of a cow to be test-milked. From said milk collecting pipe 6 a rigid milk tube 7 extends by means of an airtight connection through the partition 32 between chambers 1 and 2 which tube ends in the upper portion of chamber 2. A flexible tube 8 leading from each teat cup to the pulsator, shown at 11, is wound around a drum 9 having a central collecting pipe 10 connected to the pulsator 11 by a connecting tube 12. Leading to the pulsator 11 is also a vacuum pipe 13 connected at 14 to a vacuum source, not shown. Leading from said vacuum source is also a tube 15 adapted to be connected to a pipe or tube 16 leading through chamber 1 to the uppermost portion of chamber 2.

The registering means enclosed in chamber 1 are adapted to cooperate with a record ribbon or strip 17 which is unwound from a magazine 18 and wound on a drum 19 and passes, on its way between magazine 18 and drum 19, a registering station 20 represented in the drawing by a roll. Cooperating with this roll are the following mechanisms:

a. A device for control marking the teat cup unit, including a lever 21 cooperating with the milk receiver 6, a rod 22 controlled by said lever and provided with a retraction spring 33, and a pointed lever 23 controlled by rod 22.

b. A pencil 24 for checking the quantity. Said pencil is controlled by means of a connecting rod 25 from an arm 26 projecting through the partition between chambers 1 and 2 and extending into the path of a float 27 in chamber 2.

c. A numbering roll 28 which may be operated by a button 29 provided outside the wall of chamber 1. The feed of said strip is effected by means of a clockwork 30, and shifting of the apparatus from milking state to cleaning state or vice versa is effected by a hand lever 35 provided with an index, as indicated at 31.

The milk collecting chamber 2 is provided with a tap 32 for discharge of the milk.

The construction of the details may be varied without departing from the principle of the invention.

The operation of the apparatus described is substantially as follows:

In the description hereinbelow given it may be assumed that the cows in each cow-house are registered and indicated by individual numbers.

At the distribution of the apparatus, test vessels, such as, tubes or glasses, are also sent and are stamped with the same numbers as those of the respective cows.

For performing a test milking procedure the apparatus should be placed at an appropriate place adjacent the cow to be milked, whereupon the vacuum tube 15 is connected to the vacuum pipe 16 within the apparatus and a test glass or tube carrying the registration number of the cow is inserted into the milk collecting chamber 2. When the button 29 is pressed, the apparatus is now ready for commencing the test milking operation. Before doing this, however, it is advisable to look at the index 31 in order to be sure that it is set for milking, that is to say, that the clockwork 30 is started.

The teat cups 4 are withdrawn in succession and placed on the teats of the cow to be milked. As soon as the withdrawal of a teat cup commences, this operation is registered on the control strip by the aid of the pointed lever 23. To this end the central milk collecting pipe 6 carries a cam or the like, not shown, which operates the lever 21 on the beginning of the withdrawal. Immediately before the teat cup is completely withdrawn, this will be marked on the control strip by a stroke, for which purpose the central milk collecting pipe 6 is appropriately designed. Corresponding markings are made when the milking operation is finished and the teat cups are returned to their normal positions. The tube 5 will then be wound on the central milk collecting pipe 6 which now acts on lever 21 in the same way as before but in the reverse order. On the withdrawal and restoration of the teat cups the tube 8 will be unwound from or again wound on the drum 9. Both of the tubes 5 and 8 are acted on by springs, not shown, for retracting them, thereby securing an automatic winding of the tubes as the teat cups are restored to their normal positions in the indented portion 36 of the wall of chamber 1.

The milk collecting pipe 6 for collecting the milk from tubes 5 of the four teat cups is so constructed as to subject the teat cups to a vacuum only after the teat cups are completely withdrawn. In the drawing this is indicated by the provision in said position of a communication between the central milk space 37 of milk collecting pipe 6 and the tube 5 shown through an opening 38 formed in the outer wall 39 of the central milk space of milk collecting pipe 6. During the performance of the milking operation the milk flows from the teat cups via tubes 5, central milk space of pipe 6 and milk pipe 7 to the chamber 2. According as the milk rises in the chamber 2, the float 27 rises and when reaching a certain level acts on the arm 26, which is mounted to turn in a bearing 40 in partition 32, causing it to operate the pencil 24 by way of rod 25 and links, not shown, so as to cause it to record the milk quantity on strip 17. While the milk level is rising in the chamber 2 the test tube or glass 3 is accordingly filled, the test glass or tube having for this purpose openings 42 and 43 controlled by valves 45 and 46, respectively at its upper and lower ends for the entrance of the milk and the expelling of the air, respectively.

After the milking operation is completed and the teat cups are removed and again brought back to their normal position, shown in the drawing, the vacuum tube 15 is removed from vacuum pipe 16. The vacuum hitherto existing in the milk container 2 is thus nullified. The tap 32 can now be opened for emptying the chamber 2, allowing the milk therein to pass down into the vessel 33. After emptying the chamber 2 the test tube or glass 3 is removed and sent to the controlling station in connection with returning the milking apparatus, after the entire herd of animals has been tested in the way above described.

What we claim is:

1. A test milking apparatus comprising in combination, a vacuum milking machine including a set of teat cups and associated flexible tubes, a casing for said milking machine, reeling means in said casing supporting said flexible tubes and collecting the milk passing therethrough from the teat cups, a vacuum receptacle receiving the milk from said collecting means, a permanent connection between said milk collecting means and said receptacle, and a test vessel removably inserted in said receptacle for receiving a sample of the milk therein according as the receptacle is filled with milk.

2. An apparatus as claimed in claim 1, in which the casing defines two chambers communicating with each other, one of said chambers containing a vacuum milking machine comprising section means and teat cups and associated flexible teat cup tubes and cooperating recording and registering mechanisms while only exposing the teat cups proper, and the other chamber comprising the milk receiving chamber.

3. An apparatus as claimed in claim 2, in which the said first-mentioned chamber of the casing also contains reeling means for the flexible teat cup tubes which allows the withdrawal of the teat cups and causes an automatic retraction of the teat cups to normal position when released.

4. An apparatus as claimed in claim 3, in which the reeling device is so constructed as to connect a vacuum source to the teat cup tubes only when the tubes are unrolled to their maximum extent.

5. An apparatus as claimed in claim 1, in which the chamber containing the vacuum milking machine also contains means for registering the quantity of milk supplied to the receptacle, means for registering the operative period of each individual teat cup, and means for registering identifying notations for the animals.

6. An apparatus as claimed in claim 1, in which the receptacle is provided with a holder in its bottom to receive the test tube or glass, said holder being adapted to be closed to the surroundings by the inserted tube or glass.

ERIC REDIN.
HELGE RYDE.

REFERENCES CITED

The following references are of record in the file of this patent:

UNITED STATES PATENTS

| Number | Name | Date |
|---|---|---|
| 1,227,466 | McDowell | May 22, 1917 |
| 1,571,080 | Wright | Jan. 26, 1926 |
| 1,603,429 | Uphaus et al. | Oct. 19, 1926 |
| 1,641,229 | Lind | Sept. 6, 1927 |
| 1,646,940 | Swift | Oct. 25, 1927 |
| 1,963,653 | Curtiss | June 19, 1934 |
| 2,339,308 | Waugh | Jan. 18, 1944 |
| 2,357,373 | Anderson | Sept. 5, 1944 |